US009047311B2

(12) United States Patent  
Bandic et al.

(10) Patent No.: US 9,047,311 B2  
(45) Date of Patent: Jun. 2, 2015

(54) DEADLINE-BASED SCHEDULING IN A DISTRIBUTED FILE SYSTEM

(71) Applicant: HGST Netherlands B.V., Amsterdam (NL)

(72) Inventors: Zvonimir Bandic, San Jose, CA (US); Filip Blagojevic, Emeryville, CA (US); Cyril Guyot, San Jose, CA (US); Timothy Tsai, Alviso, CA (US); Qingbo Wang, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 49 days.

(21) Appl. No.: 13/705,715

(22) Filed: Dec. 5, 2012

(65) Prior Publication Data

US 2014/0156713 A1     Jun. 5, 2014

(51) Int. Cl.  
     *G06F 17/30* (2006.01)
(52) U.S. Cl.  
     CPC .................... *G06F 17/30215* (2013.01)
(58) Field of Classification Search  
     None  
     See application file for complete search history.

(56) References Cited

U.S. PATENT DOCUMENTS

| | | | |
|---|---|---|---|
| 6,330,625 B1 * | 12/2001 | Bridge | 710/39 |
| 7,386,694 B1 * | 6/2008 | Bezbaruah et al. | 711/162 |
| 7,412,594 B2 * | 8/2008 | Bridge | 713/1 |
| 8,145,736 B1 | 3/2012 | Tewari et al. | |
| 2003/0028509 A1 * | 2/2003 | Sah et al. | 707/1 |
| 2004/0006562 A1 * | 1/2004 | Wagner | 707/5 |
| 2008/0222142 A1 * | 9/2008 | O'Donnell | 707/5 |
| 2012/0047407 A1 | 2/2012 | Tilwani et al. | |
| 2014/0013187 A1 * | 1/2014 | Blaunstein | 714/773 |

FOREIGN PATENT DOCUMENTS

DE              36134/73              3/1976

OTHER PUBLICATIONS

Jun Feng, Marty Humphrey. "Eliminating Replica Selection—Using Multiple Replicas to Accelerate Data Transfer on Grids," icpads, pp. 359, 10th International Conference on Parallel and Distributed Systems (ICPADS'04), 2004.

Lingyun Yang, Jennifer M. Schopf, and Ian Foster. "Improving Parallel Data Transfer Times Using Predicted Variances in Shared Networks," In CCGRID '05: Proceedings of the Fifth IEEE International Symposium on Cluster Computing and the Grid (CCGrid'05).

* cited by examiner

*Primary Examiner* — Robert Beausoliel, Jr.  
*Assistant Examiner* — Pedro J Santos  
(74) *Attorney, Agent, or Firm* — Brokaw Patent Law PC; Christopher J. Brokaw

(57) ABSTRACT

Approaches for retrieving files from a replicated file system. A component receives, from a requestor, a request for a copy of a data unit. The component identifies a plurality of storage nodes that each stores a complete copy of the data unit. The component sends, to the plurality of storage nodes, an instruction to retrieve a copy of the data unit within a specified period of time. At each storage node receiving an instruction, a determination of whether the copy of the data unit may be retrieved within the specified period of time is made, and if so, the copy of the data unit is provided to the component only if the copy of the data unit was actually retrieved within the specified period. The component provides the first copy of the data unit it receives to the requestor and discards any subsequently received copies of the data unit.

16 Claims, 4 Drawing Sheets

DEADLINE-BASED SCHEDULING IN A DISTRIBUTED FILE SYSTEM

FIELD OF THE INVENTION

Embodiments of the invention generally relate to quickly retrieving data from a distributed file system.

BACKGROUND OF THE INVENTION

In many large scale file systems, data is replicated from one node to one or more other nodes. Storing multiple copies of the same data helps keep the data safe as well as facilitates faster read access to the data. By storing multiple copies of the same data, if the storage mechanism used to store one copy becomes unavailable, the data may still be available from a different storage mechanism.

Storage mechanisms for data may be located in different physical locations. An example of a storage mechanism for data is a hard-disk drive. A group of hard-disk drives may be stored in one location, such as in a cabinet. To ensure the data is available if a problem is encountered at any single location, data may be replicated to a different physical location.

Whenever a user wishes to retrieve a copy of data from a large scale file system, the user may issue a request for the data to the large scale file system. In response, the file system may route the request so that the request is serviced by the storage mechanism in the closest physical location to the origination of the request. Routing the request in this manner is done to both minimize the latency for retrieving the data as well as minimize the network bandwidth involved in processing the request.

Data may be stored in a variety of different persistent storage mediums, such as a hard-disk drive. A hard-disk drive (HDD) is a non-volatile storage device that is housed in a protective enclosure and stores digitally encoded data on one or more circular disks having magnetic surfaces (a disk may also be referred to as a platter). When a HDD is in operation, each magnetic-recording disk is rapidly rotated by a spindle system. Data is read from and written to a magnetic-recording disk using a read/write head (hereinafter "head"), which is positioned over a specific location of a disk by an actuator.

A head uses a magnetic field to read data from and write data to the surface of a magnetic-recording disk. As a magnetic dipole field decreases rapidly with distance from a magnetic pole, the distance between a head and the surface of a magnetic-recording disk must be tightly controlled. An actuator relies on a suspension's force on the head to provide the proper distance between the head and the surface of the magnetic-recording disk while the magnetic-recording disk rotates. A head therefore is said to "fly" over the surface of the magnetic-recording disk.

SUMMARY OF THE INVENTION

It is observed by the inventors that the act of moving the mechanical components of a hard-disk drive (HDD) is generally slower than electronically traversing a network. A data packet may traverse over a network in less time than it takes for the physical components of a HDD to move into the proper position to read a unit of data which has been stored at particular location on a physical disk.

Therefore, data can be retrieved faster from a location that is further away on a network (network distance refers to time latencies rather than physical distances) if the head of the HDD storing the requested data is already located close to the position in which the head needs to be to read the requested data. If the head of the HDD is not located near the desired position necessary to read the requested data, then it may take a relatively long time (i.e., several milliseconds) for the head to move into the desired position. On the other hand, if the head of a particular HDD is already located near the desired position necessary to read the requested data, then this particular HDD may be able to provide the requested data faster than another HDD that is located closer in the network but which requires additional time to move into the proper read position.

Embodiments of the invention employ these principles to realize an improved approach for retrieving files from a replicated file system. In an embodiment, a software component (such as, but not limited to, a Hadoop client) receives, from a requestor, a request for a copy of a data unit, such as a file or a chunk. Instead of retrieving the data unit from only the closest storage location of the data unit, the software component identifies a plurality of storage nodes that each stores a complete copy of the data unit. Each storage node may correspond to a hard-disk drive, a solid state device, or any other persistent storage medium for storing digital data.

The software component sends, to each of the plurality of storage nodes storing a copy of the requested data unit, an instruction to retrieve the copy of the data unit within a specified period of time (or a "deadline"). At each storage node receiving this instruction, a determination is made as to whether the copy of the data unit may be retrieved by the deadline. If the storage node determines that it can retrieve the copy of the requested data unit within the deadline, the storage node attempts to retrieve the requested copy of the data unit within the deadline. Each storage node retrieving the copy of the data unit may only provide the requested data unit to the component only if the copy of the data unit was actually retrieved by the storage node within the deadline. The component provides the first copy of the data unit it receives to the requestor and discards any subsequently received copies of the data unit.

Embodiments use the deadline to help manage network congestion. Without the use of the deadline, the amount of network traffic generated by the software component issuing requests for data units to a plurality of locations across the network may become problematic and disruptive. However, embodiments address and overcome the problem of increased network traffic through a deadline that is designed to ensure that only a small number of copies of the requested data unit are sent to the software component.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches are described herein for retrieving files from a replicated file system in less time than prior approaches. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Embodiments of the invention may be used to retrieve data from a plurality of different storage nodes in communication over a network. The storage nodes may store data organized in a distributed file system. Each node location may correspond to one or more hard-disk drives (individually abbreviated as a HDD). However, a storage node of an embodiment may correspond to any persistent storage medium for storing digital data, such as a hard-disk drive, a solid state device, and the like.

Figure 1:
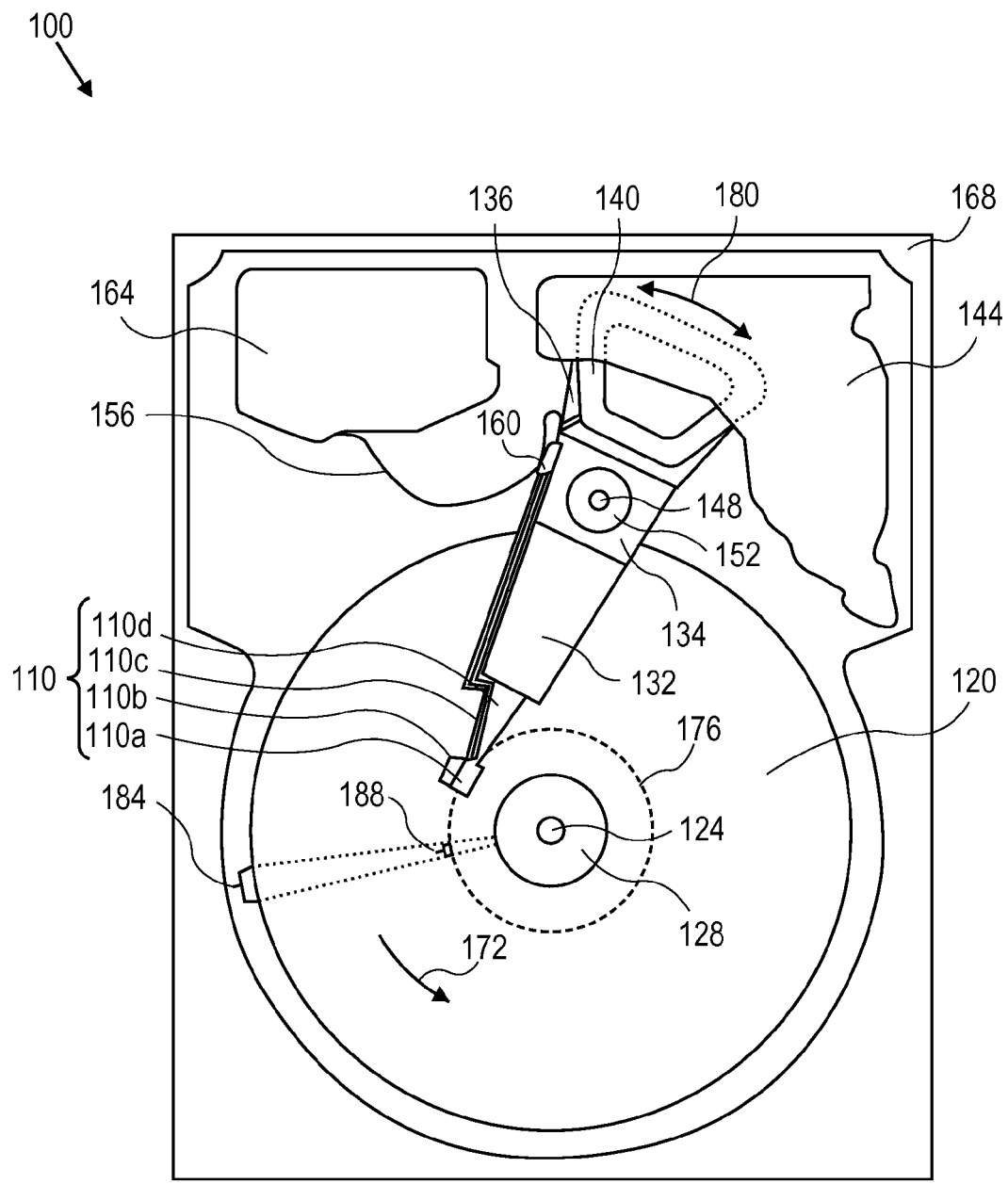
FIG. 1 is a plan view of an HDD according to an embodiment of the invention.

In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head 110a, a lead suspension 110c attached to the head 110a, and a load-beam 110d attached to the slider 110b, which includes the head 110a at a distal end of the slider 110b; the slider 110b is attached at the distal end of the loadbeam 110d to a gimbal portion of the loadbeam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
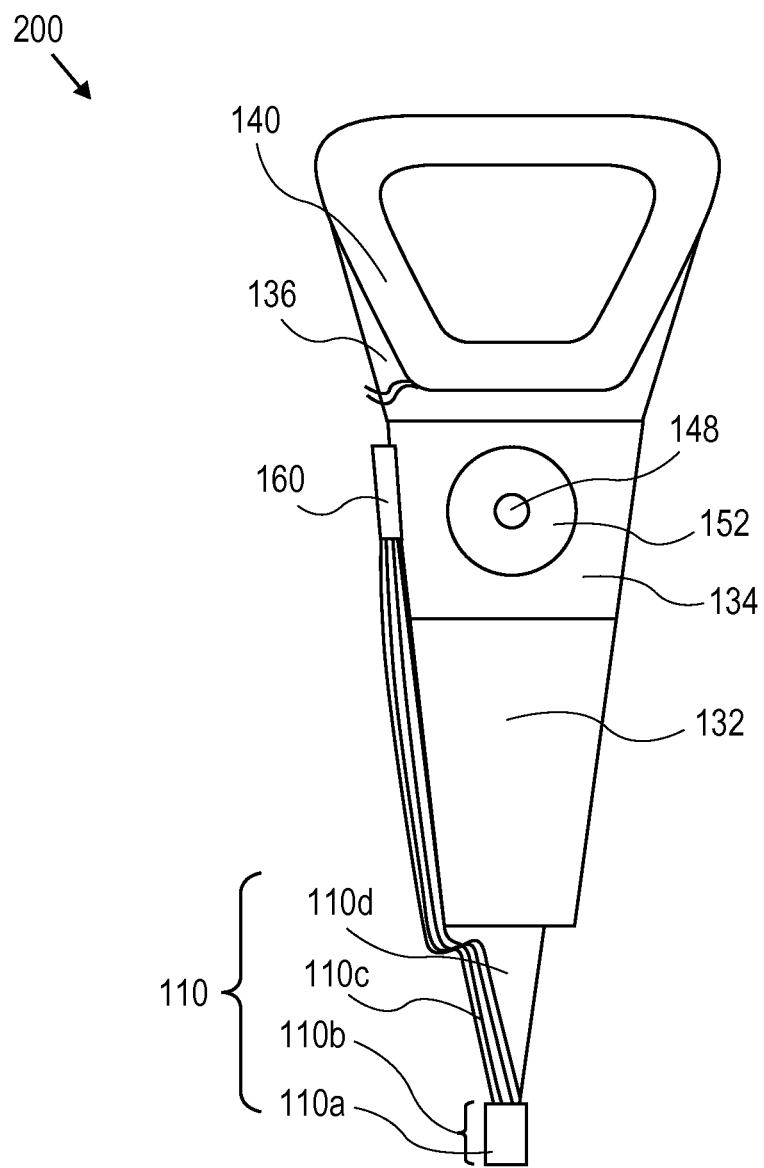
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

System Overview

Figure 3:
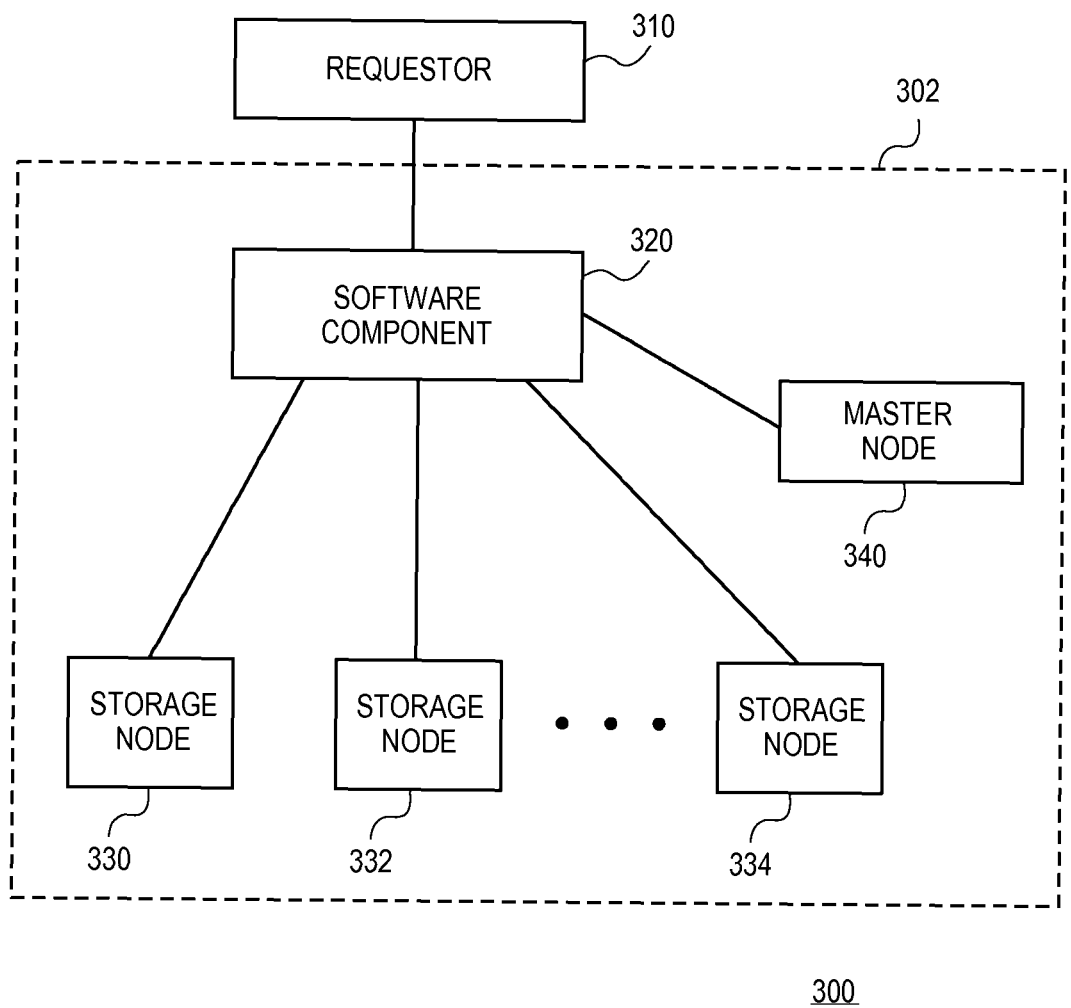
FIG. 3 is a block diagram of a system according to an embodiment of the invention.

FIG. 3 is a block diagram of a system 300 according to an embodiment of the invention. System 300 comprises requestor 310 and file system 302. Requestor 310 is intended to broadly represent any type of entity which is capable of issuing a request to and receiving a response from file system 302. It is contemplated that in many embodiments requestor 310 will be implemented in software. For example, requestor 310 may be an application that stores and retrieves data from file system 302. Requestor 310 may, but need not, reside on the same physical device as one or more components of file system 302.

File system 302 may correspond to a replicated file system. A replicated file system is a file system that is natively capable of storing redundant copies of a data unit across a plurality of storage locations. In an embodiment, file system 302 may correspond to the Hadoop® distributed file system, which is an open-source file system supported by Apache™. In other embodiments, file system 302 may be another type of cloud based filed system, such as Amazon Simple Storage Service (S3), the Google file system (GFS), and the CEPH file system. File system 302 may be comprised of and/or implemented on software component 320 and one or more storage nodes, such as storage nodes 330, 332, and 334.

File system 302 may storage redundant copies of a data unit in different physical locations. For example, copies of a data unit may be stored on a plurality of hard-disk drives in different racks or cabinets. In this way, if one rack or cabinet goes offline, other copies of the data unit may be available to service requests involving the data unit.

Software component 320 is intended to broadly represent any entity which is capable of communicating with requestor 310 and a storage node, such as storage nodes 330, 332, and 334. Software component 320 (or simply component 320) may be instructed by requestor 310 to store or retrieve data from storage nodes 330, 332, and 334. In an embodiment, software component 320 may be implemented as or correspond to a Hadoop® client that stores and retrieves data from one or more storage nodes.

File system 302 may replicate data units across storage nodes 330, 332, and 334. A data unit may correspond to different levels of granularity from implementation to implementation. For example, a data unit, as used herein, may correspond to either a file or a chunk of data.

Note that while only three storage nodes are depicted in FIG. 3, system 300 may include any number of storage nodes. Storage nodes 330, 332, and 334 may each correspond to any mechanism for persistently storing digital data, such as a hard-disk drive (HDD), a solid state device, and the like. A storage node of an embodiment may be implemented using a commodity device or an off-the-shelf device, and as such, it is contemplated that file system 302 will be composed of a large number of commodity devices, such as a combination of commodity of hard-disk drives and/or commodity solid state devices.

When requestor 310 issues a request to component 320 to retrieve a data unit from file system 302, component 320 may initially communicate with master node 340. Master node 340 stores information that identifies locations within file system 302 where copies of a data unit are stored. Master node 340 may be implemented separately from storage nodes 330, 332, and 334 or may be implemented on one of storage nodes 330, 332, and 334. Master node 340 could physically reside on one of storage nodes 330, 332, and 334, but for performance reasons, most embodiments will implement master node 340 on a separate machine. Because metadata is accessed at master node 340 every time file system 302 is accessed, the data managed by master node 340 will often reside in DRAM. After component 320 identifies where the requested data unit is stored within file system 302, component 302 retrieves the requested data unit from the storage node identified by master node 340.

In the prior art, if file system 302 stored multiple copies of a requested data unit, master node would instruct component 320 to retrieve a single copy of the requested data unit from the single location that is physically closest to component 320 to reduce network congestion and promote a fast response.

Embodiments will be described below which employ a deadline based approach which differs from this prior art approach. Advantageously, embodiments employing the deadline based approach are able to service a request for a data unit in less time than prior approaches with only a minimal increase in network traffic.

Deadline-Based Scheduling

Embodiments employ a deadline-based scheduling approach that processes a request to read a data unit within file system 302 by retrieving the requested data unit from multiple locations within file system 302. The intent is that certain storage locations of the data unit will not be able to retrieve a copy of the requested data unit within the specified deadline, and will consequently disregard a request to retrieve a copy of a data unit that it cannot achieve. If the deadline is appropriately selected, then only a small number of storage locations will respond to a request for a requested data unit. In this way, only those storage locations which can quickly process the request will actually retrieve the requested data unit, which promotes quickly retrieval of data within file system 302, saves computational resources at storage locations, and minimizes network bandwidth.

Figure 4:
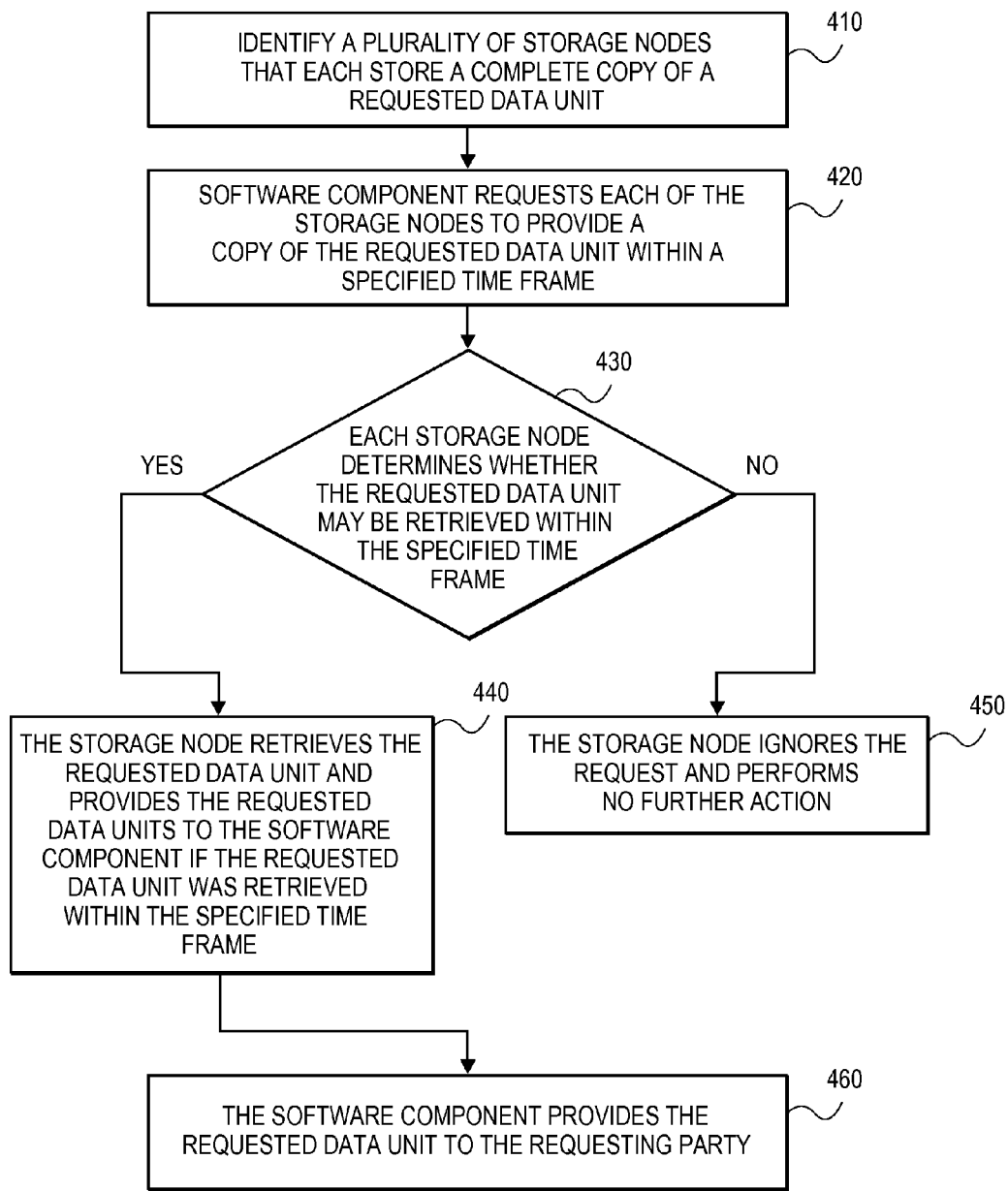
FIG. 4 is a flowchart illustrating the steps of retrieving a file from a replicated file system according to an embodiment of the invention.

FIG. 4 is a flowchart illustrating the steps of retrieving a file from file system 302 according to an embodiment of the invention. In an embodiment, the steps of FIG. 4 may be performed when requestor 310 issues a request for a particular data unit to file system 302. The request sent my requestor 310 may be received and processed by software component 320 (hereafter component 320).

In step 410, a plurality of storage nodes that each stores a complete copy of a requested data unit is identified. Step 410 may be performed by component 320 communicating with master node 340 to identify storage nodes that store a copy of a data unit that has been requested by requestor 310. Master node 340 maintains data that identifies where copies of each data unit are stored within file system 302. Upon component 320 receiving a request for a data unit within file system 302, component 320 may determine storage nodes within file system 302 at which the requested data unit is stored by communicating with master node 340.

In step 420, component 320 issues a request to each of the storage nodes identified in step 410 to provide a copy of the requested data unit within a specified time frame (referred to as a "deadline"). Component 320 may issues these requests to the one or more locations identified in step 410 in parallel. Further description is provided below regarding how embodiments may determine the deadline.

In step 430, at each storage node receiving a request in step 420, a determination is made as to whether the requested data unit may be retrieved within the deadline. For example, a particular storage node which happens to be a hard-disk drive may not be able to retrieve the requested data unit within the deadline if it will take too much time to move the head of the HDD into position to read the requested data unit from the disk. Thus, the present position of the head of a particular HDD relative to where the head needs to be in order to read the requested data unit off the disk of the HDD may determine whether the particular HDD can retrieve the requested data unit within the specified deadline. Other storage nodes may have other reasons from determining that it cannot retrieve the requested data unit within the specified deadline.

In step 440, if a particular storage node determines that the particular storage node should be able to retrieve a copy of the requested data unit within the deadline, then the particular storage node attempts to retrieve the requested data unit. If the requested data unit is actually retrieved within the deadline by the particular storage node, then the particular storage node will send a copy of the requested data unit to component 320. On the other hand, if the requested data unit is not retrieved within the deadline by the particular storage node, then the particular storage node will abort the attempt to retrieve the data unit and/or not send the requested data to component 320 upon determining that the requested data unit was not retrieved within the deadline.

In step 450, if a particular storage node determines that the particular storage node cannot retrieve a copy of the requested data unit within the deadline, then the particular storage node ignores the request of step 420 and does not attempt retrieve the requested data unit. For example, a particular hard-disk drive may determine that it cannot retrieve a copy of the requested data unit within the deadline in step 450 if the head is too far away from the location in which it needs to be in to read the requested data unit.

In step 460, component 320 provides the first copy of the requested data unit received by the component 320 to requestor 310. Any subsequent copy of the requested data unit that component 320 receives from any of storage nodes 330, 332, and 334 is discarded by component 320.

However, in the event that component 320 fails to receive a single copy of the requested data unit from any of storage nodes 330, 332, and 334 after a predetermined amount of time, component 320 may resend an instruction to retrieve a copy of the requested data unit within a second specified period of time of greater length than the first period of time originally specified.

By selecting an appropriate deadline, only a small number of storage nodes will provide a copy of the requested data unit to component 320. In this way, only those storage nodes which can quickly respond to the request will perform the request, thereby promoting the quick retrieval time within file system 302 and conserving computational resources and network bandwidth. Additional description on how the deadline may be selected by embodiments will now be provided.

Estimating the Deadline

In an embodiment, the deadline (denoted "t") may be calculated by the expression $t=F^{-1}(1-\sqrt[n]{p})$, where n is the number of storage locations, F is the cumulative distribution function of the completion time to retrieve data units at each of the plurality of locations, and p is probability that at least one storage location will provide a copy of the data unit within the deadline.

The function F may be estimated by recording the completion time of commands, issued to storage locations within file system 302, which complete within a plurality of different time intervals. For example, this estimation may be performed by recording the percentage of observed commands that finish within a time x, where x is increased by small amounts of time until all commands complete. An example data set of this technique may show that within 1 ms 0.01% of commands complete, within 2 ms 0.05% of commands complete, within 3 ms 0.5% of commands complete, within 4 ms 2% of commands complete, . . . , and within 600 ms 100% of commands complete. The function F may be modeled using the best fit line for this data. Once the function F has been estimated, the value of $F^{-1}$ at p can be found by associated to the percentage p, the corresponding smallest x such that $F(x) \geq p$.

Given a deadline $t_0$ selected according to the above-described analysis, the distribution of the number of storage locations that perform no work (i.e., the storage location does not attempt to retrieve a requested data unit because it determines it cannot do so within the deadline) will be a set of n Bernoulli trials with probability P ($x>t_0$). Therefore, the number of such storage locations will follow a binomial distribution and:

$$P(k \text{ storage locations out of n perform no work}) = nCk (1-F(t_0))^k F(t_0)^{n-k}$$

The expected number of storage locations which perform no work is therefore:

$$E=n(1-F(t_0)) \text{ or } n\sqrt[n]{p}$$

In other words, the disk/network utilization savings will be:

$$(n\sqrt[n]{p})/n = \sqrt[n]{p}$$

Thus, as an example, if 8 HDDs have the needed data (n=8) and the acceptable probably that no HDD returns the needed data is 0.01 (p=0.01), then the utilization saving is 56%. As another example, if 2 HDDs have the needed data (n=2), and p=0.01, then the utilization savings is 10%.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for retrieving a file from a replicated file system, comprising:
  one or more processors; and
  one or more machine-readable mediums storing one or more sequences of instructions, which when executed by the one or more processors, causes:
    in response to a software component receiving, from a requestor, a request for a copy of a data unit, identifying a plurality of storage nodes that each stores a complete copy of the data unit;
    the software component sending, in parallel to each of the plurality of storage nodes, an instruction to retrieve a copy of the data unit within a specified period of time,
    wherein the specified period of time is calculated using the number of the plurality of storage nodes, a cumulative distribution function of the competition time to retrieve data units at each of the plurality of storage nodes, and a probability that at least one storage node will provide a copy of the data unit within the specified period of time;

at each of the plurality of storage nodes, performing:
  determining whether the copy of the data unit may be retrieved within the specified period of time, and
  upon determining that the copy of the data unit may be retrieved within the specified period of time, (a) retrieving the copy of the data unit, and (b) providing the copy of the data unit to the software component only if the copy of the data unit was actually retrieved within the specified period of time; and at the software component, providing the first copy of the data unit received to the requestor and discarding any subsequently received copies of the data unit.

2. The system of claim 1, wherein the data unit is a chunk.

3. The system of claim 1, wherein the data unit is a file.

4. The system of claim 1, wherein the software component is capable of storing data units using a replicated file system on the plurality of storage nodes.

5. The system of claim 1, wherein a single file system replicates the data unit on each of the plurality of storage nodes.

6. The system of claim 1, wherein the specified period of time t is calculated using the expression $t=F^{-1}(1-\sqrt[n]{p})$, where n is the number of the plurality of storage nodes, F is the cumulative distribution function of the completion time to retrieve data units at each of the plurality of storage nodes, and p is the probability that at least one storage node will provide a copy of the data unit within the specified period of time.

7. The system of claim 6, wherein the function F is estimated by modeling an observed percentage of commands, issued to a set of storage nodes which include the plurality of storage nodes, which complete within a plurality of different time intervals.

8. The system of claim 1, wherein the specified period of time is a first period of time, and wherein execution of the one or more sequences of instructions further causes:
  upon the software component failing to receive the copy of the data unit from any of the plurality of storage nodes after a predetermined amount of time, the software component sending, in parallel to each of the plurality of storage nodes, an instruction to retrieve the copy of the data unit within a second specified period of time of greater length than the first period of time.

9. A method for retrieving a file from a replicated file system, comprising:
  in response to a software component receiving, from a requestor, a request for a copy of a data unit, identifying a plurality of storage nodes that each stores a complete copy of the data unit;
  the software component sending, in parallel to each of the plurality of storage nodes, an instruction to retrieve a copy of the data unit within a specified period of time,
  wherein the specified period of time is calculated using the number of the plurality of storage nodes, a cumulative distribution function of the competition time to retrieve data units at each of the plurality of storage nodes, and a probability that at least one storage node will provide a copy of the data unit within the specified period of time;
  at each of the plurality of storage nodes, performing:
    determining whether the copy of the data unit may be retrieved within the specified period of time, and
    upon determining that the copy of the data unit may be retrieved within the specified period of time, (a) retrieving the copy of the data unit, and (b) providing the copy of the data unit to the software component only if the copy of the data unit was actually retrieved within the specified period of time; and
  at the software component, providing the first copy of the data unit received to the requestor and discarding any subsequently received copies of the data unit.

10. The method of claim 9, wherein the data unit is a chunk.

11. The method of claim 9, wherein the data unit is a file.

12. The method of claim 9, wherein the software component is capable of storing data units using a replicated file system on the plurality of storage nodes.

13. The method of claim 9, wherein a single file system replicates the data unit on each of the plurality of storage nodes.

14. The method of claim 9, wherein the specified period of time t is calculated using the expression $t=F^{-1}(1-\sqrt[n]{p})$, where n is the number of the plurality of storage nodes, F is the cumulative distribution function of the completion time to retrieve data units at each of the plurality of storage nodes, and p is the probability that at least one storage node will provide a copy of the data unit within the specified period of time.

15. The method of claim 14, wherein the function F is estimated by modeling an observed percentage of commands, issued to a set of storage nodes which include the plurality of storage nodes, which complete within a plurality of different time intervals.

16. The method of claim 9, wherein the specified period of time is a first period of time, and wherein the method further comprises:
  upon the software component failing to receive the copy of the data unit from any of the plurality of storage nodes after a predetermined amount of time, the software component sending, in parallel to each of the plurality of storage nodes, an instruction to retrieve the copy of the data unit within a second specified period of time of greater length than the first period of time.

* * * * *